United States Patent
Nakamoto et al.

(10) Patent No.: US 8,283,388 B2
(45) Date of Patent: Oct. 9, 2012

(54) METHOD FOR PRODUCING SOLID ELECTROLYTE MATERIAL-CONTAINING SHEET

(75) Inventors: Hirofumi Nakamoto, Susono (JP); Yukiyoshi Ueno, Gotenba (JP); Shigenori Hama, Susono (JP); Yasushi Tsuchida, Susono (JP); Hiroshi Nagase, Susono (JP); Masato Kamiya, Susono (JP); Satoshi Wakasugi, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/673,131

(22) PCT Filed: Feb. 9, 2009

(86) PCT No.: PCT/JP2009/052159
§ 371 (c)(1),
(2), (4) Date: May 6, 2010

(87) PCT Pub. No.: WO2010/089891
PCT Pub. Date: Aug. 12, 2010

(65) Prior Publication Data
US 2012/0177997 A1    Jul. 12, 2012

(51) Int. Cl.
*B01J 49/00* (2006.01)
*B01J 19/00* (2006.01)
*H01M 6/18* (2006.01)
*C01D 15/02* (2006.01)

(52) U.S. Cl. ............... 521/27; 521/33; 521/92; 429/322; 252/182.1; 423/179.5

(58) Field of Classification Search .................... 521/27, 521/33, 92; 429/322; 423/179.5; 252/182.1
See application file for complete search history.

(56) References Cited

U.S. PATENT DOCUMENTS
4,599,284 A    7/1986    Akridge
2004/0076886 A1    4/2004    Mori et al.
2006/0166098 A1    7/2006    Tabuchi et al.
2010/0151335 A1*    6/2010    Senga et al. .................. 429/322
2011/0059363 A1    3/2011    Imanari et al.

FOREIGN PATENT DOCUMENTS

| | | |
|---|---|---|
| JP | A 62-82665 | 4/1987 |
| JP | A 9-227604 | 9/1997 |
| JP | A 10-003943 | 1/1998 |
| JP | A 11-086899 | 3/1999 |
| JP | A 11-176236 | 7/1999 |
| JP | A 2006-260821 | 9/2006 |
| JP | A 2006-286285 | 10/2006 |
| JP | A 2008-021416 | 1/2008 |
| JP | A 2008-176981 | 7/2008 |
| KR | 10-2003-0063402 A | 7/2003 |
| KR | 10-2005-0007311 A | 1/2005 |
| KR | 10-2008-0041627 A | 5/2008 |
| WO | WO 2009/005164 A1 | 1/2009 |

OTHER PUBLICATIONS

Tatsumisago et al. "All-solid state lithium secondary batteries using sulfide-based glass-ceramic electrolytes", J. of Power Chemistry, 159 (2006), p. 193-199.*

Leontiev, "Solid electrolytes based on lithium conductive electrolytes of lithium sulphide—sulphide of antimony," Ph.D. Thesis, 2003 (with partial translation).

Inada et al., "Fabrications and Properties of Composite Solid-State Electrolytes," Solid State Ionics, vol. 158, 2003, pp. 275-280.

Kanno et al., "Lithium Ionic Conductor Thio-LISICON," Journal of the Electrochemical Society, vol. 148, No. 7, 2001 pp. A742-A746.

International Search Report issued in corresponding International Application No. PCT/JP2009/052159, mailed May 19, 2009.

Nagamedianova, Z. et al. "Preparation and thermal properties of novel $Li_2S$—$Sb_2S_3$ glassy system." Journal of Non-Crystalline Solids, vol. 311, Issue 1, pp. 1-9, Oct. 2002.

* cited by examiner

*Primary Examiner* — Michael M Bernshteyn
(74) *Attorney, Agent, or Firm* — Oliff & Berridge, PLC (57) ABSTRACT

A main object of the present invention is to provide a method for producing a solid electrolyte material-containing sheet excellent in strength. The present invention attains the object by providing a method for producing a solid electrolyte material-containing sheet comprising the steps of: preparing a raw material composition containing a sulfide solid electrolyte material and a binder composition containing a monomer or oligomer having a double bond and a radical polymerization initiator; applying the raw material composition to form a sheet-shaped composition; and polymerizing the sheet-shaped composition by radical polymerization.

9 Claims, 2 Drawing Sheets

METHOD FOR PRODUCING SOLID ELECTROLYTE MATERIAL-CONTAINING SHEET

TECHNICAL FIELD

The present invention relates to a method for producing a solid electrolyte material-containing sheet (a solid electrolyte layer-forming sheet, a cathode layer-forming sheet, an anode layer-forming sheet) for use in, for example, a solid state battery. More specifically, the present invention relates to a method for producing a solid electrolyte material-containing sheet excellent in strength.

BACKGROUND ART

In recent years, information technology-related devices and communication devices such as personal computers, video cameras, and mobile phones have rapidly become popular, and therefore importance is placed on the development of batteries (e.g., lithium batteries) excellent as power sources of such devices. Further, in industrial fields other than the fields of information technology-related devices and communications-related devices, for example, in the field of automobile industry, lithium batteries and the like for use in electric cars and hybrid cars are being developed.

Conventional commercially-available lithium batteries use an organic liquid electrolyte containing a flammable organic solvent, and therefore need to have a safety device that suppresses temperature rise during short circuit and to be improved in structure and material to prevent short circuit. On the other hand, solid state batteries using a solid electrolyte instead of a liquid electrolyte have no flammable organic solvent therein, and therefore their safety devices can be simplified. For this reason, it is believed that solid state batteries are advantageous in production cost and productivity.

In the field of such solid state batteries, a powder-form sulfide solid electrolyte material is conventionally known. Such a sulfide solid electrolyte material has excellent ion conductivity, and is therefore used as a material for forming a solid electrolyte layer between a cathode layer and an anode layer, or is added to a cathode layer and an anode layer to improve ion conductivity. However, such a powder-form sulfide solid electrolyte material has a problem that its workability and moldability are poor.

In order to solve such a problem, attempts have been heretofore made to form a sheet-shaped solid electrolyte by adding a binder composition to a sulfide solid electrolyte material. For example, Patent Document 1 discloses a solid electrolyte sheet obtained by using, as a binder composition for a sulfide solid electrolyte material, a two-component binder composition curable by addition reaction (thermal addition polymerization) (see Example 4 in Patent Document 1). This binder composition exhibits bindability by polymerizing a silicone monomer by thermal addition polymerization. Further, Non-Patent Document 1 discloses the use of a silicone rubber, obtained by cross-linking a cross-linkable liquid silicone by thermal addition polymerization, as a binder for a sulfide solid electrolyte material. Such thermal addition polymerization utilizes a hydrosilylation reaction, and usually uses a hydrosilylation catalyst (e.g., Pt catalyst).

Further, Patent Document 2 discloses selective cross-linking of an unsaturated double bond-containing liquid rubber, in which a hydrosilylation catalyst is uniformly dispersed, with the use of a silicone compound having a hydrosilyl group. Further, Patent Document 3 discloses the use of a butadiene rubber as a binder for a sulfide solid electrolyte material.

Patent Document 1: Japanese Patent Application Laid-open No. 2008-021416
Patent Document 2: Japanese Patent Application Laid-open No. Hei 9-227604
Patent Document 3: Japanese Patent Application Laid-open No. Hei 11-086899
Non-Patent Document 1: Taro Inada et al., "Fabrications and properties of composite solid-state electrolytes", Solid State Ionics 158 (2003) 275-280

DISCLOSURE OF THE INVENTION

Problem to be Solved by the Invention

As described above, it is known that a sheet-shaped solid electrolyte can be obtained by a hydrosilylation reaction between a sulfide solid electrolyte material and a binder composition having a silicone monomer. However, such a sheet-shaped solid electrolyte has a problem that its sheet strength is low.

In view of the circumstances, it is therefore a main object of the present invention to provide a method for producing a solid electrolyte material-containing sheet excellent in strength.

Means for Solving the Problem

In order to achieve the above object, the present inventors have intensively studied, and as a result have found that, in the case of a conventional solid electrolyte material-containing sheet obtained by a hydrosilylation reaction, a polymerization reaction does not satisfactorily proceed (curing does not occur properly) due to poisoning of a hydrosilylation catalyst (e.g., Pt catalyst) by sulfur atoms contained in a sulfide solid electrolyte material, which is a cause of its low sheet strength. Therefore, the present inventors have made an attempt to obtain a solid electrolyte material-containing sheet by radical polymerization not requiring a hydrosilylation catalyst instead of thermal addition polymerization, and as a result have found that such a solid electrolyte material-containing sheet is excellent in strength. The present invention is based on these findings.

The present invention provides a method for producing a solid electrolyte material-containing sheet comprising the steps of: preparing a raw material composition containing a sulfide solid electrolyte material, and a binder composition having a monomer or oligomer having a double bond and a radical polymerization initiator; applying the raw material composition to form a sheet-shaped composition; and polymerizing the sheet-shaped composition by radical polymerization.

According to the present invention, radical polymerization is utilized, which makes it possible to obtain a solid electrolyte material-containing sheet excellent in strength.

In the present invention, the double bond is preferably an Si=O bond or a C=C bond. This makes it possible to obtain a solid electrolyte material-containing sheet having high ion conductivity.

In the present invention, the sulfide solid electrolyte material is preferably a glass-based sulfide solid electrolyte material or a crystal-based sulfide solid electrolyte material. Further, the glass-based sulfide solid electrolyte material is preferably a $Li_2S$—$P_2S_5$ material, a $Li_2S$—$Sb_2S_3$ material, a $Li_2S$—$SiS_2$ material, a $Li_2S$—$GeS_2$ material, or a $Li_2S$—

$B_2S_3$ material. The crystal-based sulfide solid electrolyte material is preferably a thiolisicon material. This makes it possible to obtain a solid electrolyte material-containing sheet having high ion conductivity.

In the present invention, the radical polymerization initiator is preferably a thermal radical polymerization initiator or a photo-radical polymerization initiator. This makes it possible to obtain a solid electrolyte material-containing sheet excellent in strength.

In the present invention, the solid electrolyte material-containing sheet is preferably a solid electrolyte layer-forming sheet. This makes it possible to obtain a solid electrolyte layer-forming sheet useful for, for example, a solid state battery.

In the present invention, the raw material composition may further contain an electrode active material. In this case, the solid electrolyte material-containing sheet is preferably an electrode layer-forming sheet. This makes it possible to obtain an electrode layer-forming sheet useful for, for example, a solid state battery.

The present invention also provides a method for producing a solid state battery, using a solid electrolyte material-containing sheet obtained by the above-described method for producing a solid electrolyte material-containing sheet.

The use of a solid electrolyte material-containing sheet obtained by the method according to the present invention is advantageous in that the efficiency of producing a solid state battery is improved.

EFFECT OF THE INVENTION

According to the present invention, it is possible to attain an effect of obtaining a solid electrolyte material-containing sheet excellent in strength.

DESCRIPTION OF THE REFERENCE NUMERALS 1 raw material composition
1A sheet-shaped composition
1B solid electrolyte material-containing sheet
2 substrate
11 cathode layer
12 anode layer
13 solid electrolyte layer
20 power generating element

BEST MODE FOR CARRYING OUT THE INVENTION

Hereinbelow, a method for producing a solid electrolyte material-containing sheet according to the present invention and a method for producing a solid state battery according to the present invention will be described in detail.

A. Method for Producing Solid Electrolyte Material-Containing Sheet

First, a method for producing a solid electrolyte material-containing sheet according to the present invention will be described. The method for producing a solid electrolyte material-containing sheet according to the present invention comprises the steps of: preparing a raw material composition containing a sulfide solid electrolyte material, and a binder composition containing a monomer or oligomer having a double bond and a radical polymerization initiator; applying the raw material composition to form a sheet-shaped composition; and polymerizing the sheet-shaped composition by radical polymerization.

FIGS. 1A to 1D are schematic sectional views illustrating one example of the method for producing a solid electrolyte material-containing sheet according to the present invention. As shown in FIGS. 1A to 1D, first of all, a raw material composition 1 containing a powder-form sulfide solid electrolyte material ($70Li_2S$-$30P_2S_5$), a binder composition containing a monomer (silicone monomer) having a double bond and a radical polymerization initiator (di(4-methylbenzoyl) peroxide), and a solvent (heptane) is prepared (see FIG. 1A). Then, a substrate 2 is prepared (see FIG. 1B), and the raw material composition 1 is applied onto the substrate 2 by a doctor blade method and dried to form a sheet-shaped composition 1A (see FIG. 1C). Finally, the sheet-shaped composition 1A is heated to perform radical polymerization to obtain a solid electrolyte material-containing sheet 1B (see FIG. 1D). It is to be noted that, as will be described later, the thus obtained solid electrolyte material-containing sheet 1B may be peeled from the substrate 2 or may not be peeled from the substrate 2.

According to the present invention, it is possible to obtain a solid electrolyte material-containing sheet excellent in strength by utilizing radical polymerization. As described above, a conventional method utilizing thermal addition polymerization performed in the presence of a hydrosilylation catalyst (e.g., Pt catalyst) has a problem in that a polymerization reaction does not satisfactorily proceed due to the poisoning of the hydrosilylation catalyst by sulfur atoms contained in a sulfide solid electrolyte material. On the other hand, in the case of the method according to the present invention, since polymerization is performed by radical polymerization not requiring a hydrosilylation catalyst, a polymerization reaction satisfactorily proceeds and therefore a solid electrolyte material-containing sheet excellent in strength can be obtained.

Further, it is also conventionally known that a solid electrolyte material-containing sheet can be obtained by applying a composition containing a sulfide solid electrolyte material and a polymer binder dissolved in a solvent. In this case, there is a problem that a polar solvent cannot be generally used because of the high reactivity of the sulfide solid electrolyte material. In addition, there is also a problem that the use of a polymer binder narrows the range of solvent choices because the solubility of a polymer binder used should be taken into consideration in selecting a solvent. On the other hand, in the case of the method according to the present invention, since a binder composition containing a monomer or an oligomer is used, a greater variety of solvents can be used as compared to a case where a polymer binder is used. This is advantageous in that process flexibility is increased.

Further, a solid electrolyte material-containing sheet obtained by the method according to the present invention is excellent in strength and flexibility, and therefore has the following advantages. A solid electrolyte material-containing sheet obtained by the method according to the present invention has higher shape stability to vibrations of a conveyor belt or the like as compared to a powder-form solid electrolyte material or a conventional weak solid electrolyte material-containing sheet, which makes it possible to continuously produce a battery by a so-called Roll to Roll process. Further, a powder-form solid electrolyte material has a problem that a desired shape cannot be obtained by flat-platen pressing due to air pressure generated by pressing. On the other hand, a solid electrolyte material-containing sheet obtained by the method according to the present invention is excellent in strength, and is therefore free from such a problem caused by air pressure generated by pressing. Further, a molded product of a powder-form solid electrolyte material and a conventional weak solid electrolyte material-containing sheet have a problem that their edges are likely to be chipped when they are cut into desired shapes. On the other hand, a solid electrolyte material-containing sheet obtained by the method according to the present invention is excellent in strength, and therefore its edges are less likely to be chipped, thereby ensuring high quality.

Hereinbelow, each of the steps of the method for producing a solid electrolyte material-containing sheet according to the present invention will be described.

1. Preparation Step

First, the preparation step of the method according to the present invention will be described. In the preparation step of the present invention, a raw material composition containing a sulfide solid electrolyte material and a binder composition containing a monomer or oligomer having a double bond and a radical polymerization initiator is prepared.

Meanwhile, a solid electrolyte material-containing sheet obtained by the method according to the present invention is broadly divided into a solid electrolyte layer-forming sheet for forming a solid electrolyte layer between a cathode layer and an anode layer, and an electrode layer-forming sheet for forming a cathode layer or an anode layer. A raw material composition prepared for forming a solid electrolyte layer-forming sheet and a raw material composition prepared for forming an electrode layer-forming sheet are different in composition, and therefore will be described below separately.

(1) Case where Solid Electrolyte Material-Containing Sheet is Solid Electrolyte Layer-Forming Sheet In this case, the raw material composition usually contains a sulfide solid electrolyte material, a binder composition, and a solvent, but does not contain an electrode active material etc. which will be described later.

(i) Sulfide Solid Electrolyte Material

The sulfide solid electrolyte material to be used in the present invention is not particularly limited as long as it contains a sulfur atom and has ion conductivity. Examples of such a sulfide solid electrolyte material include a glass-based sulfide solid electrolyte material and a crystal-based sulfide solid electrolyte material. Specific examples of the glass-based sulfide solid electrolyte material include a $Li_2S$—$P_2S_5$ material, a $Li_2S$—$Sb_2S_3$ material, a $Li_2S$—$SiS_2$ material, a $Li_2S$—$GeS_2$ material, a $Li_2S$—$B_2S_3$ material. Further, the glass-based sulfide solid electrolyte material preferably contains cross-linking sulfur from the viewpoint of improvement in ion conductivity. Examples of a method for producing such a glass-based sulfide solid electrolyte material include mechanical milling such as ball milling, and melting and rapid quenching. The glass-based sulfide solid electrolyte material containing cross-linking sulfur can be obtained by appropriately adjusting the composition of raw materials.

On the other hand, examples of the crystal-based sulfide solid electrolyte material include a thiolisicon material and $Li_7P_3S_{11}$. Specific examples of the thiolisicon material include a Li—Ge—P—S material, a Li—P—S material, and a Li—Si—P—S material. Such a thiolisicon material can be produced by, for example, a solid phase process.

The sulfide solid electrolyte material to be used in the present invention is preferably in the form of powder from the viewpoint of dispersibility. In this case, the average particle size of the sulfide solid electrolyte material is preferably in the range of 0.01 μm to 100 μm, and more preferably in the range of 0.1 μm to 30 μm. If the average particle size of the sulfide solid electrolyte material is too large, there is a possibility that it becomes difficult to obtain a solid electrolyte material-containing sheet having a desired density. On the other hand, if the average particle size of the sulfide solid electrolyte material is too small, there is a possibility that it becomes difficult to prepare such a sulfide solid electrolyte material itself.

(ii) Binder Composition

Hereinbelow, the binder composition to be used in the present invention will be described. The binder composition to be used in the present invention contains a monomer or oligomer having a double bond and a radical polymerization initiator. The binder composition is polymerized by radical polymerization in the polymerization step, which will be described later, and then functions as a binder for binding the sulfide solid electrolyte material. In the present invention, the term "oligomer" refers to a polymer obtained by polymerizing some monomer molecules. The number of monomer molecules contained in the oligomer is preferably 20 or less, and more preferably in the range of 2 to 10. It is to be noted that, in the present invention, both the monomer and the oligomer may be used.

The monomer or oligomer to be used in the present invention preferably has low reactivity with the sulfide solid electrolyte material. This is because if the monomer or oligomer is reacted with the sulfide solid electrolyte material before polymerization, there is a possibility that a desired solid electrolyte material-containing sheet cannot be obtained. Therefore, the double bond of the monomer or oligomer also preferably has low reactivity with the sulfide solid electrolyte material as with the above case. Preferred examples of such a double bond include an Si=O bond and a C=C bond. This is because these bonds have lower reactivity with the sulfide solid electrolyte material. It can be considered that a C=C bond has particularly low reactivity with the sulfide solid electrolyte material because the polarity of a C=C bond is relatively smaller than that of an Si=O bond. Further, by using a monomer or oligomer having an Si=O bond, it is possible to obtain a solid electrolyte material-containing sheet excellent in ion conductivity, which will be described later with reference to specific examples.

Here, the monomer or oligomer having an Si=O bond is usually a silicone monomer or a silicone oligomer. Specific examples of the silicone monomer include compounds represented by the general formula O=$SiR_1R_2$ (where $R_1$ and $R_2$ are each independently a nonpolar group). Examples of the nonpolar groups $R_1$ and $R_2$ include a saturated hydrocarbon-based functional group and an unsaturated hydrocarbon-based functional group. Specific examples of the saturated hydrocarbon-based functional group and the unsaturated hydrocarbon-based functional group include alkyl groups such as a methyl group, an ethyl group, and a propyl group; alkenyl groups such as a vinyl group and an allyl group; and aryl groups such as a phenyl group. Further, the silicone monomer to be used in the present invention preferably has a nonpolar functional group.

On the other hand, specific examples of the monomer having a C=C bond include hydrocarbon compounds such as propylene and butylene and compounds having S or P in the skeleton thereof. Among them, hydrocarbon compounds are preferred.

Hereinbelow, the radical polymerization initiator to be used in the present invention will be described. The radical polymerization initiator to be used in the present invention is not particularly limited as long as it can generate free radicals to initiate radical polymerization. Specific examples of such a radical polymerization initiator include a thermal radical polymerization initiator that generates free radicals by heating and a photo-radical polymerization initiator that generates free radicals by light irradiation. Among them, the radical polymerization initiator to be used in the present invention is preferably a thermal radical polymerization initiator. This makes it possible to reliably perform polymerization throughout a sheet-shaped composition (solid electrolyte material-containing sheet) which will be described later.

Specific examples of the thermal radical polymerization initiator include: acetophenone derivatives such as 4-(2-hydroxyethoxy)phenyl(2-hydroxy-2-propyl)ketone, α-hydroxy-α-α'-dimethylacetophenone, methoxyacetophenone, and 2,2-dimethoxy-2-phenylacetophenone; benzoin ether compounds such as benzoin ethyl ether and benzoin propyl ether; ketal derivatives such as benzyl dimethyl ketal; halogenated ketone; acylphosphine oxide; acylphosphonate; 2-methyl-1-[4-(methylthio)phenyl]-2-morpholinopropane-1-on; 2-benzyl-2-N,N-dimethylamino-1-(4-morpholinophenyl)-1-butane; bis(2,4,6-trimethylbenzoyl)-phenylphosphine oxide; bis-(2,6-dimethoxybenzoyl)2,4,4-trimethylpentylphosphine oxide; bis(η5-cyclopentadienyl)-bis(pentafluorophenyl)-titanium; bis(η5-cyclopentadienyl)-bis[2,6-difluoro-3-(1H-pyrr-1-yl)phenyl]-titanium; anthracene; perylene; coronene; tetracene; benzanthracene; phenothiazine; flavin; acridine; ketocoumarin; thioxanthone derivatives; benzophenone; acetophenone; 2-chlorothioxanthone; 2,4-dimethylthioxanthone; 2,4-diethylthioxanthone; 2,4-diisopropylthioxanthone; isopropylthioxanthone; and di(4-methylbenzoyl)peroxide.

On the other hand, specific examples of the photo-radical polymerization initiator include dimethoxyacetophenone, diethoxy phenyl ketone, 1-hydroxyhexyl phenyl ketone, acetophenone, propiophenone, benzophenone, xanthol, fluorein, benzaldehyde, anthraquinone, triphenylamine, carbazole, 3-methylacetophenone, 4-methylacetophenone, 3-pentylacetophenone, 4-methoxyacetophenone, 3-bromoacetophenone, p-diacetylbenzene, 3-methoxybenzophenone, 4-allylacetophenone, 4-methylbenzophenone, 4-chloro-4-benzylbenzophenone, 3-chloroxanthone, 3,9-dichloroxanthone, 3-chloro-8-nonylxanthone, benzoyl, benzoin methyl ether, benzoin butyl ether, bis(4-dimethylaminophenyl)ketone,benzyl methoxy ketal, and 2-chlorothioxanthone.

The radical polymerization initiator to be used in the present invention is preferably a peroxide-based radical polymerization initiator or a hydroperoxide-based radical polymerization initiator. Alternatively, AIBN (azobisisobutyronitrile) may be used as the radical polymerization initiator. It is to be noted that the ratio between the monomer or oligomer and the radical polymerization initiator contained in the binder composition is not particularly limited as long as a radical polymerization reaction can satisfactorily proceed.

(iii) Solvent Contained in Raw Material Composition

The solvent contained in the raw material composition is preferably one having low reactivity with the sulfide solid electrolyte material, and particularly preferably a nonpolar solvent. Further, the solvent contained in the raw material composition preferably has a high ability to dissolve the above-described monomer or oligomer. Examples of such a solvent include alkanes such as hexane and heptane and aromatic compounds such as toluene and xylene. Alternatively, a fluorine compound may be used as the solvent.

(iv) Composition of Raw Material Composition

In a case where a solid electrolyte material-containing sheet obtained by the method according to the present invention is a solid electrolyte layer-forming sheet, as described above, the raw material composition usually contains a sulfide solid electrolyte material, a binder composition, and a solvent. Therefore, in this case, the sulfide solid electrolyte material and the binder composition are contained substantially as solid matter in the raw material composition.

The binder composition content in the solid matter contained in the raw material composition is not particularly limited as long as a desired solid electrolyte layer-forming sheet can be obtained. However, the binder composition content is preferably 0.5 wt % or more, more preferably 3 wt % or more, and even more preferably 5 wt % or more, but is preferably 30 wt % or less, and more preferably 20 wt % or less. This makes it possible to obtain a solid electrolyte material-containing sheet having a good balance between sheet strength and ion conductivity.

Further, a larger amount of the binder composition added tends to reduce the ion conductivity of a solid electrolyte layer-forming sheet. Therefore, in the present invention, the binder composition is preferably added in such an amount that a solid electrolyte layer-forming sheet having an ion conductivity of, for example, 0.1 mS/cm or more can be obtained. This is because such a solid electrolyte layer-forming sheet is more suitable for practical use. It is to be noted that the solvent content in the raw material composition is preferably appropriately selected depending on the application method used.

(2) Case where Solid Electrolyte Material-Containing Sheet is Electrode Layer-Forming Sheet In this case, the raw material composition usually contains at least an electrode active material in addition to the sulfide solid electrolyte material, the binder composition, and the solvent. If necessary, the raw material composition may further contain a conductive material. It is to be noted that the term "electrode layer-forming sheet" specifically means a cathode layer-forming sheet for forming a cathode layer and an anode layer-forming sheet for forming an anode layer.

It is to be noted that the sulfide solid electrolyte material and the binder composition contained in the raw material composition used in this case are the same as those described above, and therefore descriptions thereof are not repeated here.

(i) Electrode Active Material

The electrode active material to be used in the present invention can be broadly divided into a cathode active material and an anode active material. The cathode active material is not particularly limited, and a generally-used cathode active material can be used. Specific examples of such a cathode active material include $LiCoO_2$, $LiMnO_2$, $Li_2NiMn_3O_8$, $LiVO_2$, $LiCrO_2$, $LiFePO_4$, $LiCoPO_4$, $LiNiO_2$, and $LiNi_{1/3}Co_{1/3}Mn_{1/3}O_2$. The anode active material is also not particularly limited, and a usually-used anode active material can be used. Specific examples of such an anode active material include a metal-based active material and a carbon-based active material. Specific examples of the metal-based active material include In, Al, Si, and Sn. On the other hand, specific examples of the carbon-based active material include mesocarbon microbeads (MCMB), high-orientation graphite (HOG), hard carbon, and soft carbon.

(ii) Conductive Material

As described above, the raw material composition to be used in the present invention may further contain a conductive material. By adding a conductive material, it is possible to obtain an electrode layer-forming sheet having improved conductivity. Examples of the conductive material include acetylene black, ketjen black, and carbon fiber.

(iii) Composition of Raw Material Composition

In a case where a solid electrolyte material-containing sheet obtained by the method according to the present invention is an electrode layer-forming sheet, as described above, the raw material composition usually contains a sulfide solid electrolyte material, a binder composition, an electrode active material, and a solvent, and if necessary, further contains a conductive material. Therefore, in this case, components other than the solvent are contained substantially as solid matter in the raw material composition.

The sulfide solid electrolyte material content in the solid matter contained in the raw material composition is not particularly limited as long as a desired electrode layer-forming sheet can be obtained. However, the sulfide solid electrolyte material content is preferably in the range of, for example, 20 vol % to 80 vol %. This makes it possible to obtain an electrode layer-forming sheet excellent in ion conductivity.

The electrode active material content in the solid matter contained in the raw material composition is not particularly limited, but is preferably in the range of, for example, 20 vol % to 80 vol %. This makes it possible to obtain an electrode layer-forming sheet excellent in capacity. Further, the conductive material content in the solid matter contained in the raw material composition is not particularly limited, but is preferably 10 vol % or less. This makes it possible to obtain an electrode layer-forming sheet excellent in conductivity.

It is to be noted that the binder composition content in the solid matter contained in the raw material composition is the same as that described above, and therefore a description thereof is not repeated here.

2. Application Step

Hereinbelow, the application step of the method according to the present invention will be described. The application step of the method according to the present invention is a step of applying the raw material composition to form a sheet-shaped composition (see FIGS. 1B and 1C). A method for applying the raw material composition is not particularly limited as long as a desired sheet-shaped composition can be formed, and a generally-used application method can be used. A specific example of such an application method includes a doctor blade method.

A substrate onto which the raw material composition is to be applied is not particularly limited as long as the raw material composition can be applied thereon to form a sheet-shaped composition. Examples of the material of such a substrate include resins, metals, and glass. Particularly, in a case where a solid electrolyte material-containing sheet obtained by the method according to the present invention is an electrode layer-forming sheet, the substrate may be an electrode current collector. This eliminates the necessity to remove the substrate and makes it possible to easily obtain an electrode with excellent adhesion. Examples of the material of a cathode current collector include SUS, aluminum, nickel, iron, titanium, and carbon. On the other hand, examples of the material of an anode current collector include SUS, copper, nickel, and carbon.

According to the present invention, the raw material composition applied onto the substrate is dried to form a sheet-shaped composition. Conditions for drying are not particularly limited as long as the solvent contained in the raw material composition can be appropriately removed. It is to be noted that in a case where thermal radical polymerization is performed in the polymerization step which will be described later, drying of the raw material composition and thermal radical polymerization may be performed in a continuous manner.

According to the present invention, the thickness of the sheet-shaped composition varies depending on the type of target solid electrolyte material-containing sheet. For example, in a case where a target solid electrolyte material-containing sheet is a solid electrolyte layer-forming sheet, the thickness of the sheet-shaped composition is usually in the range of 10 µm to 300 µm, and preferably in the range of 30 µm to 120 µm. On the other hand, in a case where a target solid electrolyte material-containing sheet is an electrode layer-forming sheet, the thickness of the sheet-shaped composition is usually in the range of 10 µm to 300 µm, and preferably in the range of 50 µm to 150 µm.

3. Polymerization Step

Hereinbelow, the polymerization step of the method according to the present invention will be described. The polymerization step of the method according to the present invention is a step of polymerizing the sheet-shaped composition by radical polymerization (see FIG. 1D). A method for initiating radical polymerization varies depending on the type of radical polymerization initiator used, and examples thereof include heating and light irradiation.

The heating temperature is not particularly limited as long as thermal radical polymerization can be initiated, but is preferably in the range of, for example, 0° C. to 300° C., and more preferably in the range of 60° C. to 250° C. The heating time is not particularly limited as long as a desired polymerization reaction can proceed, but is preferably in the range of, for example, 1 minute to 24 hours, and more preferably in the range of 10 minutes to 2 hours.

Examples of light to be used for light irradiation include UV rays and electron rays. It is to be noted that various conditions for light irradiation are preferably appropriately selected depending on the type of photo-radical polymerization initiator used.

According to the present invention, the polymerization is preferably satisfactorily performed to such a degree that unreacted monomer or oligomer molecules do not remain. This is because if unreacted monomer or oligomer molecules remain, there is a possibility that the sheet strength of an obtained solid electrolyte material-containing sheet is low or an unnecessary side reaction occurs in a finally-produced battery. It is to be noted that determination as to whether unreacted monomer or oligomer molecules are present or absent can be made by, for example, measuring an appropriate exothermic peak by TG-DTA (ThermoGravimetry-Differential Thermal Analysis).

4. Others

The method according to the present invention may further comprise the step of pressing the solid electrolyte material-containing sheet in addition to the above-described steps. This makes it possible to increase the density of the solid electrolyte material-containing sheet, thereby improving ion conductivity. If necessary, the method according to the present invention may further comprise the step of washing the solid electrolyte material-containing sheet. The thickness of a solid electrolyte material-containing sheet obtained by the method according to the present invention is not particularly limited, but is preferably in the range of, for example, 10 μm to 300 μm, and more preferably in the range of 30 μm to 150 μm.

A solid electrolyte material-containing sheet obtained by the method according to the present invention can be applied to, for example, a battery. Particularly, the solid electrolyte material-containing sheet produced as a solid electrolyte layer-forming sheet can be used for, for example, a solid state battery. Examples of the solid state battery include a solid lithium battery, a solid sodium battery, a solid magnesium battery, and a solid calcium battery. Among these batteries, a solid lithium battery is preferred. On the other hand, the solid electrolyte material-containing sheet produced as an electrode layer-forming sheet can be used for, for example, a solid state battery or a battery having a liquid electrolyte. The types of the solid state battery are the same as those described above. Examples of the battery having a liquid electrolyte include a lithium ion battery, a sodium ion battery, a magnesium ion battery, and a calcium ion battery. Among these batteries, a lithium ion battery is preferred.

B. Method for Producing Solid State Battery

Hereinbelow, a method for producing a solid state battery according to the present invention will be described. The method for producing a solid state battery according to the present invention uses a solid electrolyte material-containing sheet obtained by the above-described method for producing a solid electrolyte material-containing sheet.

According to the present invention, the use of the above-described solid electrolyte material-containing sheet is advantageous in that the efficiency of producing a solid state battery is improved and a high-quality solid state battery can be obtained.

Figure 1A:
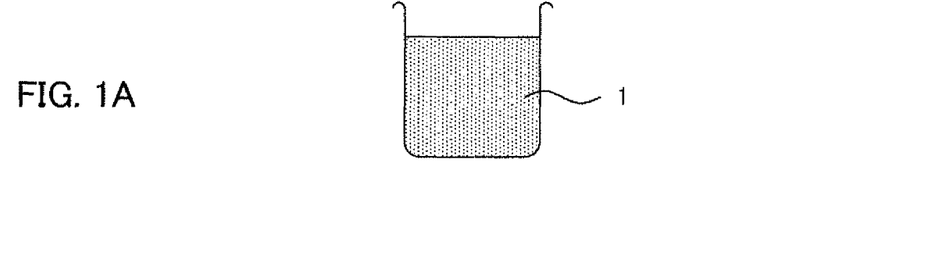
FIGS. 1A to 1D are schematic sectional views illustrating one example of a method for producing a solid electrolyte material-containing sheet according to the present invention.
Figure 1B:
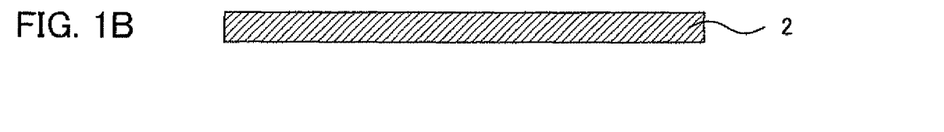
Figure 1C:
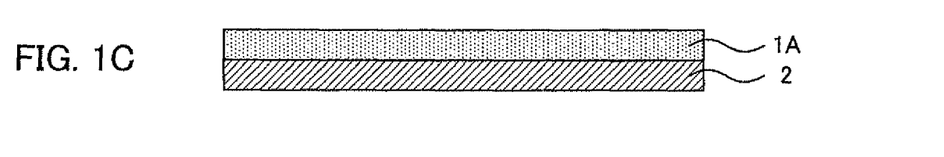
Figure 1D:
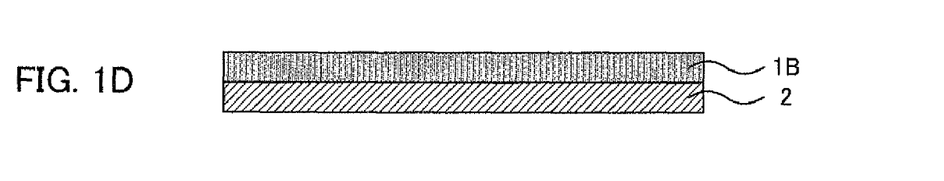
Figure 2:
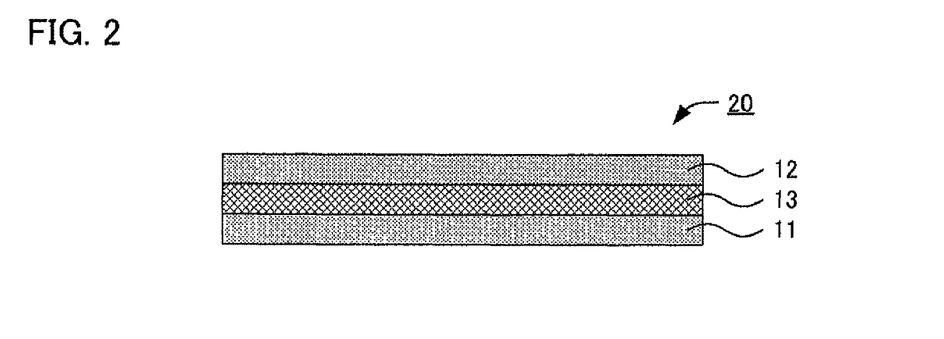
FIG. 2 is a schematic sectional view of one example of a power generating element of a solid state battery obtained by a method according to the present invention.

FIG. 2 is a schematic sectional view showing one example of a power generating element of a solid state battery obtained by the method according to the present invention. A power generating element 20 shown in FIG. 2 includes a cathode layer 11 containing a cathode active material, an anode layer 12 containing an anode active material, and a solid electrolyte layer 13 formed between the cathode layer 11 and the anode layer 12. Although not shown in the drawing, the solid state battery obtained by the method according to the present invention usually includes a cathode current collector for collecting current from a cathode, an anode current collector for collecting current from an anode, and a battery case in addition to the above-described power generating element.

As described above, the method for producing a solid state battery according to the present invention comprises using a solid electrolyte material-containing sheet obtained by the method described above with reference to "A. Method for Producing Solid Electrolyte Material-Containing Sheet". Further, as described above, the solid electrolyte material-containing sheet can be broadly divided into a solid electrolyte layer-forming sheet, a cathode layer-forming sheet, and an anode layer-forming sheet. Therefore, in a solid state battery obtained by the method according to the present invention, at least one of a solid electrolyte layer, a cathode layer, and an anode layer is constituted from the above-described solid electrolyte material-containing sheet. Particularly, in the present invention, all the solid electrolyte layer, the cathode layer, and the anode layer are preferably constituted from the above-described solid electrolyte material-containing sheet. This makes it possible to obtain a solid state battery excellent in ion conductivity.

The method for producing a solid state battery according to the present invention is not particularly limited as long as the above-described solid electrolyte material-containing sheet is used, and a generally-used method can be used. An example of the method for producing a solid state battery according to the present invention will be described below. First, a solid electrolyte layer-forming sheet, a cathode layer-forming sheet, and an anode layer-forming sheet are prepared, and each of the sheets is cut into a predetermined shape. Then, the solid electrolyte layer-forming sheet, the cathode layer-forming sheet, and the anode layer-forming sheet are placed in a battery case so that a solid electrolyte layer is interposed between a cathode layer and an anode layer, and in this state, pressing is performed. Finally, the battery case is hermetically sealed.

As the battery case to be used in the present invention, a battery case generally used for a solid state battery can be used. Examples of such a battery case include battery cases made of SUS. The above-described power generating element may be formed inside an insulating ring. A solid state battery obtained by the method according to the present invention can have any shape such as a coin, laminated, cylindrical, or rectangular shape. Examples of a solid state battery obtained by the method according to the present invention include a solid lithium battery, a solid sodium battery, a solid magnesium battery, and a solid calcium battery. Among them, a solid lithium battery is preferred. A solid state battery obtained by the method according to the present invention may be either a primary battery or a secondary battery, but a secondary battery is preferred because it can repeat charge and discharge and is therefore useful as, for example, an in-car battery.

The present invention is not limited to the above embodiments. The above-described embodiments are mere examples, and those having substantially the same structure as technical ideas described in the appended claims and providing similar effects are included in the scope of the present invention.

EXAMPLES

Hereinbelow, the present invention will be described in more detail with reference to the following examples. It is to be noted that all the operation procedures were performed in a glove box filled with argon gas or under an argon gas atmosphere unless otherwise specified.

Example 1-1

Preparation of Sulfide Solid Electrolyte Material 7.0 parts by mol of lithium sulfide ($Li_2S$) and 3.0 parts by mol of diphosphorus pentasulfide ($P_2S_5$) were premixed in an agate mortar to obtain a mixture. Then, the mixture was homogeneously mixed by dry mechanical milling at 300 rpm for 20 hours, and was then thermally treated at 290° C. for 2 hours to obtain a powder-form glass-based sulfide solid electrolyte material ($70Li_2S\text{-}30P_2S_5$).

(Preparation of Solid Electrolyte Material-Containing Sheet)

Then, the glass-based sulfide solid electrolyte material obtained above, a binder composition (silicone monomer ($O=Si(CH_3)_2$): di(4-methylbenzoyl)peroxide=50:1 (weight ratio)) curable by radical polymerization, and heptane were prepared. Then, a predetermined amount (corresponding to 0.5 wt % of the total weight of a solid electrolyte material-containing sheet to be obtained) of the binder composition was mixed with and dissolved in 4.1 g of heptane, and then the glass-based sulfide solid electrolyte material was added thereto to obtain a raw material composition having a total weight of 8.6 g. The raw material composition was cast onto a SUS substrate by a doctor blade while being kept in a stable dispersion state, then dried at 120° C. for 1.5 hours, and then heated at 200° C. for 15 minutes to perform radical polymerization. As a result, a solid electrolyte material-containing sheet having a thickness of 150 μm was obtained. It is to be noted that TG-DTA measurement was performed on the obtained solid electrolyte material-containing sheet, and as a result, an exothermic peak due to polymerization of the silicone monomer was not detected. From the result, it was confirmed that the radical polymerization completely proceeded.

Examples 1-2 to 1-5

Solid electrolyte material-containing sheets were obtained in the same manner as in Example 1-1 except that the amount of the binder composition added was changed to 5 wt %, 10 wt %, 20 wt %, and 30 wt %, respectively, with respect to the total weight of a solid electrolyte material-containing sheet to be obtained. It is to be noted that TG-DTA measurement was performed on all the thus obtained solid electrolyte material-containing sheets, and as a result, no exothermic peaks due to polymerization of the silicone monomer were detected. From the result, it was confirmed that the radical polymerization completely proceeded.

Comparative Example 1-1

The glass-based sulfide solid electrolyte material obtained in Example 1-1, a two-component binder composition curable by addition polymerization (CY52® manufactured by Dow Corning Toray Co., Ltd., silicone monomer: curing agent (Pt catalyst)=10:1 (weight ratio)), and heptane were prepared. Then, a predetermined amount (corresponding to a final solid weight ratio of 5 wt o) of the binder composition was mixed with and dissolved in 5.7 g of heptane to obtain a solution. Then, 200 mg of the solution and 200 mg of the glass-based sulfide solid electrolyte material were mixed to obtain a raw material composition. The raw material composition was cast onto a SUS substrate by a doctor blade while being kept in a stable dispersion state, then dried at 120° C. for 1 hour, and then heated at 170° C. for 10 minutes to perform addition polymerization. As a result, a solid electrolyte material-containing sheet having a thickness of 150 μm was obtained.

Comparative Example 1-2

A solid electrolyte material-containing sheet was obtained in the same manner as in Comparative Example 1-1 except that the amount of the binder composition added was changed to an amount corresponding to a final solid weight ratio of 10 wt %.

<Evaluation 1>

(1) Measurement of Peel Strength

The peel strength of each of the solid electrolyte material-containing sheets obtained in Examples 1-1 to 1-5 and Comparative Examples 1-1 and 1-2 was measured to evaluate sheet strength. Peel strength measurement was performed using an adhesive tape (ultrastrong double-faced adhesive tape HJ-9210e manufactured by Nitto Denko Corporation) and a peeling tester (push-pull type, MODEL-2257® manufactured by AIKOH ENGINEERING CO., LTD.), and a set pressure at which peeling was started was 50 N. In this way, the force required to peel the solid electrolyte material-containing sheet from the SUS substrate was measured, and the measurement results are shown in FIG. 3.

Figure 3:
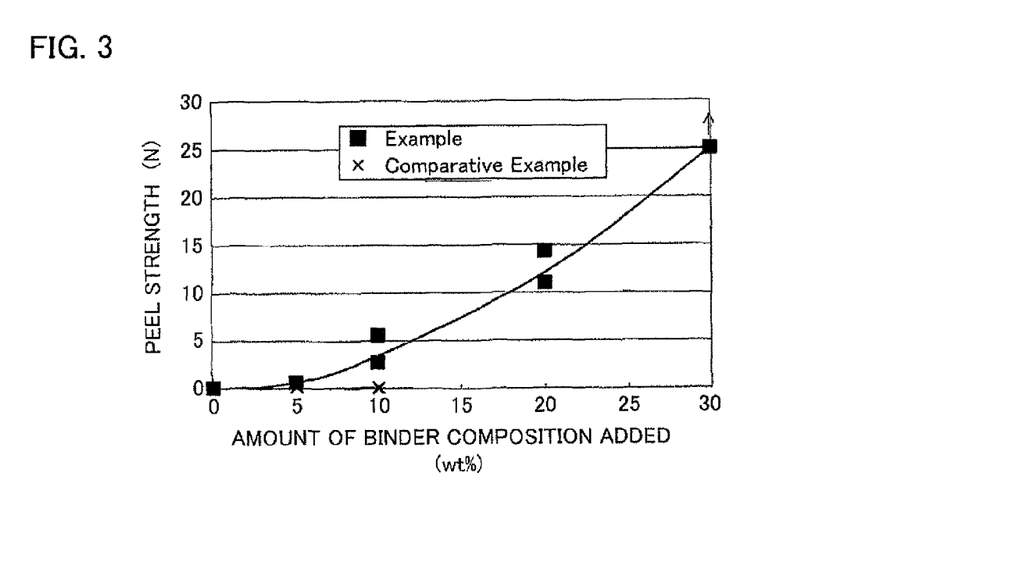
FIG. 3 is a graph showing the results of peel strength measurement.

As shown in FIG. 3, all the solid electrolyte material-containing sheets of Examples 1-1 to 1-5 were excellent in strength. Further, it was confirmed that the peel strength was increased as the amount of the binder composition added was increased. On the other hand, both the solid electrolyte material-containing sheet of Comparative Example 1-1 (amount of binder composition added: 5 wt %) and the solid electrolyte material-containing sheet of Comparative Example 1-2 (amount of binder composition added: 10 wt %) had a peel strength of 0 N, which indicates that the peel strength was not dependent on the amount of the binder composition added. From the result, it was confirmed that polymerization hardly proceeded, thus resulting in a low sheet strength.

(2) Ion Conductivity Measurement

The ion conductivity of each of the solid electrolyte material-containing sheets obtained in Examples 1-1 to 1-5 was measured in the following manner. First, the solid electrolyte material-containing sheet was pressed at a pressure of 4 ton/cm$^2$, and then the impedance of the thus obtained solid electrolyte material-containing sheet was measured (voltage magnitude: 10 mV, measurement frequency: 1 MHz to 0.1 Hz, 25° C.) to calculate a resistance. From the resistance and the thickness of the pressed solid electrolyte material-containing sheet, the ion conductivity of the solid electrolyte material-containing sheet was calculated. The results are shown in FIG. 4.

Figure 4:
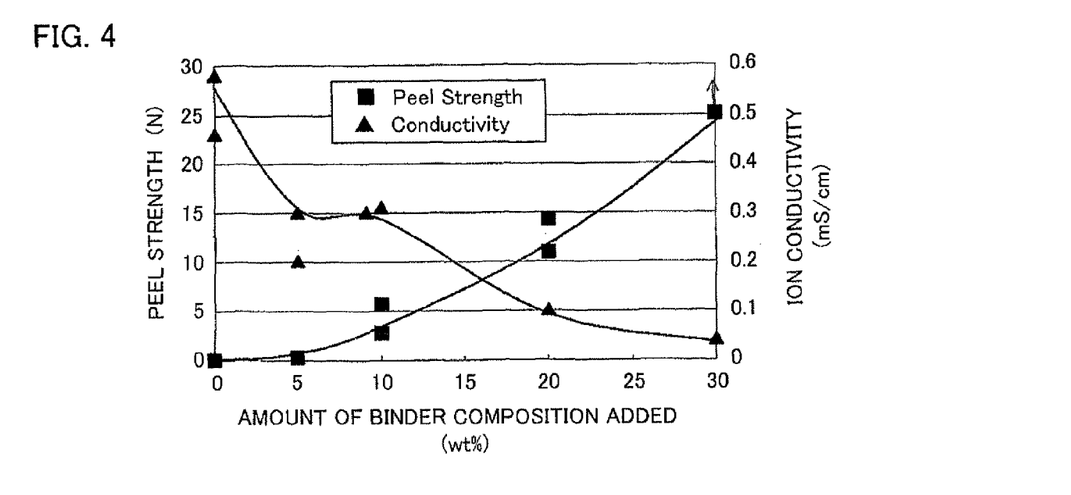
FIG. 4 is a graph showing the results of ion conductivity measurement.

As shown in FIG. 4, it was confirmed that the peel strength was increased as the amount of the binder composition added was increased, but the ion conductivity tended to be lower as the amount of the binder composition added was increased. From the viewpoint of the balance between the peel strength and the ion conductivity, it has been confirmed that the amount of the binder composition added is preferably in the range of 5 wt % to 20 wt %. It has been also confirmed that the ion conductivity is particularly excellent when the amount of the binder composition added is in the range of 5 wt % to 10 wt %.

Example 2

0.4 g of the binder composition used in Example 1-1 was mixed with and dissolved in 2.4 g of heptane to obtain a solution, and then, 1.3 g of the glass-based sulfide solid electrolyte material used in Example 1-1 and 3.0 g of LiCoO$_2$ (cathode active material) were added to the solution to obtain a raw material composition. A solid electrolyte material-containing sheet was obtained in the same manner as in Example 1-1 except that the raw material composition was changed to one obtained in Example 2. The above-described peel strength measurement was performed on the thus obtained solid electrolyte material-containing sheet, and as a result, it was confirmed that the solid electrolyte material-containing sheet had a peel strength (about 0.3 N) nearly equal to that derived from the relationship between the peel strength and the amount of the binder composition added shown in FIG. 3.

Example 3

0.4 g of the binder composition used in Example 1-1 was mixed with and dissolved in 2.4 g of heptane to obtain a solution, and then 2.1 g of the glass-based sulfide solid electrolyte material used in Example 1-1 and 2.1 g of graphite (anode active material) were added to the solution to obtain a raw material composition. A solid electrolyte material-containing sheet was obtained in the same manner as in Example 1-1 except that the raw material composition was changed to one obtained in Example 3. The above-described peel strength measurement was performed on the thus obtained solid electrolyte material-containing sheet, and as a result, it was confirmed that the solid electrolyte material-containing sheet had a peel strength (about 0.2 N) nearly equal to that derived from the relationship between the peel strength and the amount of the binder composition added shown in FIG. 3.

Example 4

A powder-form glass-based sulfide solid electrolyte material ($75Li_2S-25Sb_2S_3$) was obtained in the same manner as in Example 1-1 except that 75 parts by mol of lithium sulfide ($Li_2S$) and 25 parts by mol of diantimony trisulfide ($Sb_2S_3$) were used. Then, a predetermined amount (corresponding to 10 wt % of the total weight of a solid electrolyte material-containing sheet to be obtained) of the binder composition used in Example 1-1 was mixed with and dissolved in 4.1 g of heptane to obtain a solution, and then the glass-based sulfide solid electrolyte material was added to the solution to obtain a raw material composition having a total weight of 8.6 g. A solid electrolyte material-containing sheet was obtained in the same manner as in Example 1-1 except that the raw material composition was changed to one obtained in Example 4.

Example 5

A powder-form glass-based sulfide solid electrolyte material ($66.6Li_2S-33.3SiS_2$) was obtained in the same manner as in Example 1-1 except that 66.6 parts by mol of lithium sulfide ($Li_2S$) and 33.3 parts by mol of silicon disulfide ($SiS_2$) were used. Then, a predetermined amount (corresponding to 10 wt % of the total weight of a solid electrolyte material-containing sheet to be obtained) of the binder composition used in Example 1-1 was mixed with and dissolved in 4.1 g of heptane to obtain a solution, and then the glass-based sulfide solid electrolyte material was added to the solution to obtain a raw material composition having a total weight of 8.6 g. A solid electrolyte material-containing sheet was obtained in the same manner as in Example 1-1 except that the raw material composition was changed to one obtained in Example 5.

Example 6

A powder-form glass-based sulfide solid electrolyte material ($66.6Li_2S-33.3GeS_2$) was obtained in the same manner as in Example 1-1 except that 66.6 parts by mol of lithium sulfide ($Li_2S$) and 33.3 parts by mol of germanium disulfide ($GeS_2$) were used. Then, a predetermined amount (corresponding to 10 wt % of the total weight of a solid electrolyte material-containing sheet to be obtained) of the binder composition used in Example 1-1 was mixed with and dissolved in 4.1 g of heptane to obtain a solution, and then the glass-based sulfide solid electrolyte material was added to the solution to obtain a raw material composition having a total weight of 8.6 g. A solid electrolyte material-containing sheet was obtained in the same manner as in Example 1-1 except that the raw material composition was changed to one obtained in Example 6.

Example 7

A powder-form crystal-based sulfide solid electrolyte material (thiolisicon: $Li_{3.25}Ge_{0.25}P_{0.75}S_4$) was synthesized according to a method described in Ryoji Kanno et al., "Lithium Ionic Conductor Thio-LISICON", Journal of Electrochemical Society, 148 (7) A742-A746 (2001) and Japanese Patent Application Laid-open No. Hei 11-176236. Then, a predetermined amount (corresponding to 10 wt % of the total weight of a solid electrolyte material-containing sheet to be obtained) of the binder composition used in Example 1-1 was mixed with and dissolved in 4.1 g of heptane to obtain a solution, and then the crystal-based sulfide solid electrolyte material was added to the solution to obtain a raw material composition having a total weight of 8.6 g. A solid electrolyte material-containing sheet was obtained in the same manner as in Example 1-1 except that the raw material composition was changed to one obtained in Example 7.

Comparative Example 2

A predetermined amount (corresponding to a final solid weight ratio of 10 wt %) of the binder composition used in Comparative Example 1-1 was mixed with and dissolved in 5.7 g of heptane to obtain a solution. Then, 50 mg of the solution and 50 mg of the glass-based sulfide solid electrolyte material ($75Li_2S-25Sb_2S_3$) used in Example 4 were mixed to obtain a raw material composition. A solid electrolyte material-containing sheet was obtained in the same manner as in Comparative Example 1-1 except that the raw material composition was changed to one obtained in Comparative Example 2.

Comparative Example 3

A predetermined amount (corresponding to a final solid weight ratio of 10 wt %) of the binder composition used in Comparative Example 1-1 was mixed with and dissolved in 5.7 g of heptane to obtain a solution. Then, 50 mg of the solution and 50 mg of the glass-based sulfide solid electrolyte material ($66.6Li_2S-33.3SiS_2$) used in Example 5 were mixed to obtain a raw material composition. A solid electrolyte material-containing sheet was obtained in the same manner as in Comparative Example 1-1 except that the raw material composition was changed to one obtained in Comparative Example 3.

Comparative Example 4

A predetermined amount (corresponding to a final solid weight ratio of 10 wt %) of the binder composition used in Comparative Example 1-1 was mixed with and dissolved in 5.7 g of heptane to obtain a solution. Then, 50 mg of the solution and 50 mg of the glass-based sulfide solid electrolyte material ($66.6Li_2S-33.3GeS_2$) used in Example 6 were mixed to obtain a raw material composition. A solid electrolyte material-containing sheet was obtained in the same manner as in Comparative Example 1-1 except that the raw material composition was changed to one obtained in Comparative Example 4.

Comparative Example 5

A predetermined amount (corresponding to a final solid weight ratio of 10 wt %) of the binder composition used in Comparative Example 1-1 was mixed with and dissolved in 5.7 g of heptane to obtain a solution. Then, 50 mg of the solution and 50 mg of the crystal-based sulfide solid electrolyte material ($Li_{3.25}Ge_{0.25}P_{0.75}S_4$) used in Example 7 were mixed to obtain a raw material composition. A solid electrolyte material-containing sheet was obtained in the same manner as in Comparative Example 1-1 except that the raw material composition was changed to one obtained in Comparative Example 5.

<Evaluation 2>

The above-described peel strength measurement was performed on the solid electrolyte material-containing sheets obtained in Examples 4 to 7 and Comparative Examples 2 to 5. As a result, it was confirmed that each of the solid electrolyte material-containing sheets obtained in Examples 4 to 7 exhibited a peel strength nearly equal to one derived from the relationship between the peel strength and the amount of the binder composition added shown in FIG. 3. From the result, it has been confirmed that the present invention is useful for various sulfide solid electrolyte materials. On the other hand, each of the solid electrolyte material-containing sheets obtained in Comparative Examples 2 to 5 had a peel strength of 0 [N]. From the result, it was confirmed that polymerization hardly proceeded, thus resulting in a low sheet strength.

The invention claimed is:

1. A method for producing a solid electrolyte material-containing sheet comprising the steps of:
    preparing a raw material composition containing a sulfide solid electrolyte material, and a binder composition having a monomer or oligomer having a double bond and a radical polymerization initiator;
    applying the raw material composition to form a sheet-shaped composition; and
    polymerizing the sheet-shaped composition by radical polymerization.

2. The method for producing a solid electrolyte material-containing sheet according to claim 1, wherein the double bond is an Si=O bond or a C=C bond.

3. The method for producing a solid electrolyte material-containing sheet according to claim 1, wherein the sulfide solid electrolyte material is a glass-based sulfide solid electrolyte material or a crystal-based sulfide solid electrolyte material.

4. The method for producing a solid electrolyte material-containing sheet according to claim 3, wherein the glass-based sulfide solid electrolyte material is a $Li_2S$—$P_2S_5$ material, a $Li_2S$—$Sb_2S_3$ material, a $Li_2S$—$SiS_2$ material, a $Li_2S$—$GeS_2$ material, or a $Li_2S$—$B_2S_3$ material.

5. The method for producing a solid electrolyte material-containing sheet according to claim 3, wherein the crystal-based sulfide solid electrolyte material is a thiolisicon material.

6. The method for producing a solid electrolyte material-containing sheet according to claim 1, wherein the radical polymerization initiator is a thermal radical polymerization initiator or a photo-radical polymerization initiator.

7. The method for producing a solid electrolyte material-containing sheet according to claim 1, wherein the solid electrolyte material-containing sheet is a solid electrolyte layer-forming sheet.

8. The method for producing a solid electrolyte material-containing sheet according to claim 1, wherein the raw material composition further contains an electrode active material, and wherein the solid electrolyte material-containing sheet is an electrode layer-forming sheet.

9. A method for producing a solid state battery wherein a solid electrolyte material-containing sheet obtained by the method for producing a solid electrolyte material-containing sheet according to claim 1 is used.

* * * * *